(12) United States Patent
Jaunasse et al.

(10) Patent No.: US 10,472,002 B2
(45) Date of Patent: Nov. 12, 2019

(54) METHOD FOR PRODUCING A HYBRID-STRUCTURE PART OF A MOTOR VEHICLE AND CORRESPONDING HYBRID-STRUCTURE PART

(71) Applicants: RENAULT s.a.s., Boulogne-Billancourt (FR); COMPAGNIE PLASTIC OMNIUM, Lyons (FR)

(72) Inventors: Philippe Jaunasse, Paris (FR); Laurent Rocheblave, Villeurbanne (FR)

(73) Assignees: RENAULT SAS, Boulogne-Billancourt (FR); COMPAGNIE PLASTIC OMNIUM, Lyons (FR)

( * ) Notice: Subject to any disclaimer, the term of this patent is extended or adjusted under 35 U.S.C. 154(b) by 0 days.

(21) Appl. No.: 15/529,646

(22) PCT Filed: Dec. 21, 2015

(86) PCT No.: PCT/FR2015/053669
§ 371 (c)(1),
(2) Date: May 25, 2017

(87) PCT Pub. No.: WO2016/102859
PCT Pub. Date: Jun. 30, 2016

(65) Prior Publication Data
US 2017/0327157 A1 Nov. 16, 2017

(30) Foreign Application Priority Data
Dec. 23, 2014 (FR) .................................... 14 63218

(51) Int. Cl.
*B62D 29/00* (2006.01)
*B29C 43/18* (2006.01)
(Continued)

(52) U.S. Cl.
CPC ............ *B62D 29/004* (2013.01); *B29C 43/18* (2013.01); *B29C 45/14* (2013.01); *B29C 70/085* (2013.01);
(Continued)

(58) Field of Classification Search
CPC .................................................... B62D 29/004
(Continued)

(56) References Cited

FOREIGN PATENT DOCUMENTS

DE            30 11 336 A1    10/1981
DE    10-2009-042272 A1    3/2011
(Continued)

OTHER PUBLICATIONS

Translation of DE-102009042272-A1, Kellner et al., Mar. 31, 2011 (Year: 2011).*
(Continued)

*Primary Examiner* — Brent T O'Hern
(74) *Attorney, Agent, or Firm* — Sughrue Mion, PLLC

(57) ABSTRACT

The invention concerns a method for producing a hybrid-structure part of a motor vehicle, comprising shaping of a sheet of metallic material, the provision of a sheet of composite material, application of a layer of connecting material on a face of said metallic material sheet or on a face of said composite material sheet, the shaping of a hybrid element by shaping said composite material sheet to the shape of said metallic material sheet and joining the composite material sheet to the metallic material sheet by means of said connecting material layer, and the production of rigidification elements by overmoulding using a polymer material.

6 Claims, 2 Drawing Sheets

Figure 1:
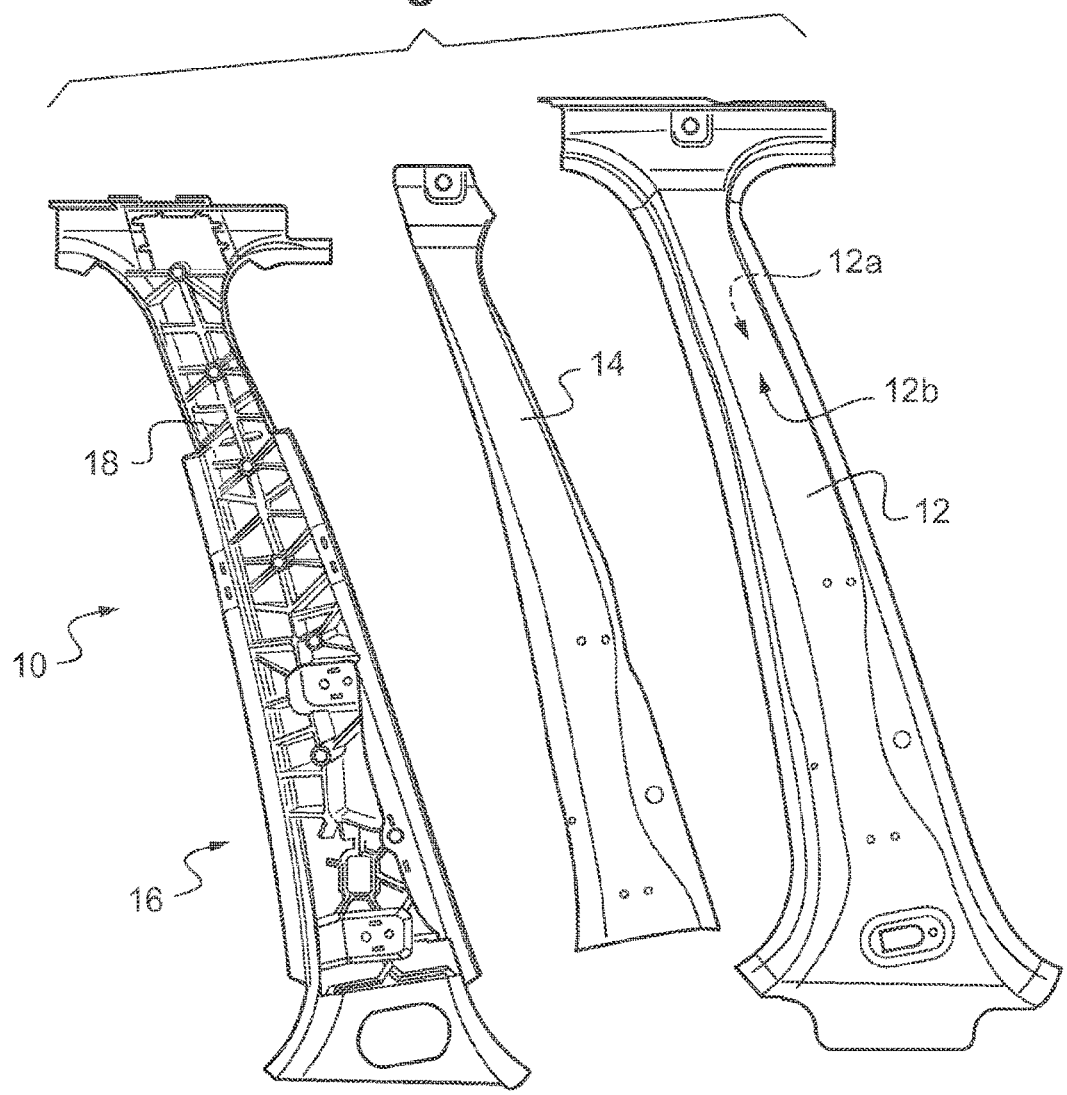

(51) Int. Cl.
- *B29C 45/14* (2006.01)
- *B62D 25/04* (2006.01)
- *B29C 70/34* (2006.01)
- *B29C 70/88* (2006.01)
- *B29C 70/08* (2006.01)
- *B29L 31/30* (2006.01)

(52) U.S. Cl.
CPC .......... *B29C 70/345* (2013.01); *B29C 70/885* (2013.01); *B62D 25/04* (2013.01); *B62D 29/005* (2013.01); *B29L 2031/3002* (2013.01)

(58) Field of Classification Search
USPC .......................................................... 428/99
See application file for complete search history.

(56) References Cited

FOREIGN PATENT DOCUMENTS

| | | | | |
|---|---|---|---|---|
| DE | 102009042272 A1 | * | 3/2011 | ............. B29C 43/18 |
| EP | 0 370 342 A2 | | 8/1993 | |
| EP | 1 550 604 B1 | | 4/2008 | |

OTHER PUBLICATIONS

International Search Report for PCT/FR2015/053669 dated Apr. 14, 2016 (PCT/ISA/210).

PCT Written Opinion for PCT/FR2015/053667 dated Apr. 14, 2016 (PCT/ISA/237).

\* cited by examiner

METHOD FOR PRODUCING A HYBRID-STRUCTURE PART OF A MOTOR VEHICLE AND CORRESPONDING HYBRID-STRUCTURE PART

CROSS REFERENCE TO RELATED APPLICATIONS

This application is a National Stage of International Application No. PCT/FR2015/053669 filed Dec. 21, 2015, claiming priority based on French Patent Application No. 1463218 filed Dec. 23, 2014, the contents of all of which are incorporated herein by reference in their entirety.

The invention concerns a method for producing a hybrid-structure part of a motor vehicle and a corresponding hybrid-structure part.

The term hybrid-structure part refers to a structural part formed by several different materials, notably a metallic material and one or more polymer materials.

Certain structural members of a motor vehicle are particularly subjected to stress during an impact and must be able to absorb part of the impact energy in order to maintain the integrity of the vehicle structure. Such structural members must also be sufficiently strong to withstand various structural functions. This is the case, for example, of an automobile centre pillar, which is subjected to a high degree of stress during a side impact and must also maintain the rear door via hinges and the resistance of the front door via the closing system of the latter.

In addition, manufacturers are looking to lighten motor vehicle structures to reduce their energy consumption.

So-called hybrid structures formed of different materials are known, generally a metallic material and a polymer material.

Document DE3011336A1 discloses a lightweight component obtained by assembling a metal sheet and a fiber-reinforced polymer material through bonding or pressing. The method described produces a part with an enhanced external appearance, although the strength of the part obtained is not mentioned.

Document EP0370342A2 describes a lightweight structural part that is easy to produce and has good strength and stiffness. The part is formed from a hollow piece having, inside its cavity, a network of ribs made of an injected polymer material. The hollow part can be metallic or can be a fiber-reinforced polymer shaped by hot pressing. The network of ribs is joined to the hollow part by crosswise connections. This type of connection has the disadvantage of weakening the hollow part. In addition, such a connection by discontinuous points does not allow the hollow part and the rib network to be worked in combination in an optimal manner and hinders the shedding of weight.

Document EP1550604B1 describes a method for producing a hybrid-structure part wherein a sheet of metallic material, previously coated with a heat-activated surface coating, is formed, then a thermoplastic material is applied to the face of the sheet of metallic material having the surface coating. While the strength of this type of hybrid part is appropriate for semi-structural parts, it may prove inadequate in an impact, particularly for structural parts of the automobile chassis such as a centre pillar, pillar A or C, longitudinal outer siderail, roof cross member, impact beam, or any other structural vehicle element.

Document DE 102009042272A1 describes a structural part having a reinforcing layer of polymer material placed on a sheet of metal and a reinforcing structure made of thermoplastic material applied to the reinforcing layer and having ribs. The edges of the metal sheet are not covered by the reinforcing layer or the reinforcing structure.

The invention aims to overcome these drawbacks by proposing a method for producing a hybrid-structure part of a motor vehicle that is both lightweight and resistant, notably in the case of impact.

In relation thereto, the purpose of the invention concerns a method for producing a hybrid-structure part of a motor vehicle, characterized in that it comprises the following steps:

(a) shaping of a sheet of metallic material, (b) provision of a sheet of composite material comprising at least one layer of fibers impregnated or embedded in a polymer matrix, notably thermoplastic or thermosetting, said layer of fibers being selected from among a layer of unidirectional fibers and a layer of woven fibers, (c) application of a layer of bonding material on one face of said sheet of metallic material, before or after shaping, or on one face of said sheet of composite material before or after shaping, (d) formation of a hybrid element by shaping of said sheet of composite material to the shape of said sheet of metallic material and joining of the sheet of composite material to the sheet of metallic material by means of said layer of bonding material, (e) production of rigidification elements by overmolding of at least a part of the hybrid element thus formed using a polymer material (a thermoplastic or thermosetting polymer, for example) to form a hybrid-structure part.

Such a method allows a hybrid-structure part to be obtained that is particularly resistant, notably to impacts, and lightweight. The sheet of metallic material offers good resistance to elongation and in case of significant deformation, the sheet of composite material matches the shape of the sheet of metallic material and increases the rigidity and the mechanical strength of the assembly while increasing the ability of the assembly to absorb impacts. Finally, the overmolded polymer material stiffens and consolidates the hybrid-structure part.

According to the invention, the shaping step (d) of a hybrid element is implemented so that the sheet of composite material partially covers one face of said sheet of metallic material, and the step (e) of producing rigidification elements is implemented so that the polymer material covers, at least partially, the parts of the face of the sheet of metallic material not covered by said sheet of composite material.

It should be noted that steps (a) and (b) can take place in any order; these steps may be reversed.

Step (a)

As far as the shaping step (a) is concerned, this step may be a cold or hot working step. The sheet of metallic material can be sheet metal, for example with a thickness of 0.1 to 1.5 mm, advantageously 0.1 to 1 mm, preferably 0.2 to 0.8 mm. This sheet of metallic material may be aluminum, magnesium, titanium or alloy based on one or more of these metals or can be an iron-based alloy, for example a steel or a stainless steel. The metallic material may be a cold-workable material, notably steel.

The metallic sheet preferably forms an external part of the final hybrid-structure part. As this sheet is metallic, an assembly on the vehicle body is possible by the usual welding techniques, without modification of the methods that currently exist on factory assembly lines.

Step (b)

As far as the step (b) of provisioning a sheet of composite material is concerned, the sheet comprises at least one layer of fibers impregnated or embedded in a thermoplastic or thermosetting polymer matrix, said layer of fibers being selected from among a layer of unidirectional fibers and a layer of woven fibers. The layer(s) of fibers thus form continuous reinforcements, which extend over the entire or part of the length of the part or over the entire or part of its surface. The presence of one or more layers of this type thus improves the strength of the hybrid-structure part.

When the sheet of composite material has several layers of unidirectional fibers, the latter are preferably all aligned in the same direction. Generally speaking, the direction of the unidirectional fibers is chosen parallel to the largest dimension of the part to be produced.

In case several layers of woven fibers are present, the main directions of the fibers can be identical or different from one layer to another.

Advantageously, the unidirectional fibers or the fibers of the woven fiber web may be arranged along the largest dimension of the structural part to be produced in order to improve the strength of the part along its largest dimension.

According to an embodiment, the sheet of composite material may comprise at least one layer of unidirectional fibers and at least one layer of woven fibers. The unidirectional fibers improve the rigidity and the resistance to stresses in the direction of the fibers while the woven fibers improve the resistance to impacts of the hybrid-structure part. A hybrid-structure part is thereby obtained that is particularly able to resistant and absorb impacts.

Advantageously, the sheet of composite material provided in step (b) can comprise one or more layers of identical or different fibers, said fibers being selected from among glass fibers, carbon fibers, basalt fibers, metallic fibers, and aramid fibers.

Preferably, the sheet of composite material can comprise at least one layer of unidirectional carbon fibers and at least one layer of woven glass fibers.

The present invention is not limited by a particular number of layers of unidirectional and/or woven fibers. The number of layers may, for example, be chosen according to the desired strength, notably rupture strength, and/or according to the desired maximum thickness. The sheet of composite material can have, for example, a thickness of 3 to 6 mm, advantageously 3 to 5 mm, and preferably 4 to 5 mm.

Advantageously, the sheet of composite material can comprise alternating stacks of unidirectional fiber layers and stacks of woven fiber layers. These stacks may comprise 2 to 6 layers of superimposed fibers. The stacks can advantageously be distributed symmetrically. Up to 7 stacks or more can be foreseen, for example. For example, 5 stacks consisting of 2 of 6 layers of fibers.

The fiber content of the sheet of composite material can be variable. It is, for example, from 40 to 85% by weight, advantageously from 50 to 85%, and preferably from 55 to 80%.

The thermoplastic polymer material present in the sheet of composite material may be selected from the following: aliphatic polyamides (PA), polyphthalamides (PPA), polybutylene terephthalate (PBT), polyethylene terephthalate (PET), polycarbonates (PC), even polypropylene and their mixtures. For example, polyamide 66 (PA66), or polyamide 6 (PA6) can be used.

The thermosetting polymer material present in the sheet of composite material may be selected from a polyester resin, ester vinyl, epoxy, polyurethane or their mixture. It is thus possible to form an SMC (Sheet Molding Compound) type product.

The sheet of composite material can be produced by known methods such as RTM (Resin Transfer Molding) methods possibly at high pressure, by compression (by calandering, for example), on double belt presses, by pultrusion or another suitable method, for example the monomer impregnation methods during polymerization.

Such a sheet of composite material offers the final hybrid-structure part high energy absorption capacity, thereby improving its resistance to impacts. The sheet of composite material combines numerous failure modes when it is subjected to severe deformation, with each failure mode absorbing energy. These failure modes are notably:
  rupture of the polymer,
  rupture of the fibers,
  delamination between the layers of composite (when multiple layers exist),
  loss of cohesion between the fibers and the polymer,
  friction between the fibers and the polymer.

Step (c)

This step can be performed before or after the shaping step (a), preferably after, or after step (b).

The layer of bonding material can be a layer of polymer material, preferably chemically compatible with the polymer of the sheet of composite material, although this is not mandatory.

Advantageously, the bonding material is able to join the sheet of composite material to the sheet of metallic material under predetermined temperature conditions. The bonding material is said to be "heat-activatable", also known as a "hot-melt" adhesive.

For example, the conditions in which the bonding material is heat activatable are the hot stamping conditions of the sheet of composite material or the overmolding conditions of the overmolding material.

The bonding material can be a crosslinkable material. For this type of material, subsequent softening is not possible, notably upon exposure to a predetermined temperature for a given duration (advantageously those of the hot stamping conditions of the sheet of composite material or those of a cataphoresis cycle and painting on a manufacturing line). This has the advantage of at least partially joining the sheet of composite material to the sheet of metallic material with enough holding power to allow it to then pass through all the heating steps on the production line of an automobile manufacturer while limiting, or even blocking, the movement of the two sheets relative to one another which allows them to be held in the correct geometrical position even if the crosslinking reaction ends during the heating processes at the manufacturer.

The bonding material can also be a non-crosslinking hot-melt material. The non-crosslinking hot-melt bonding material can be selected from among copolyester-based or copolyamide-based materials, or polyolefine-based elastomer thermoplastics.

The crosslinkable hot-melt bonding material can be selected from among copolyamide-based materials, possibly comprising an isocyanate, an epoxide, or even a polyolefine. Adhesive type bonding materials are described in WO2010-136241A1, EP2435246A1.

Other types of materials are also conceivable provided they enable heat bonding, such as silicone-based materials for example, described in CA 2321884C, or HCM (Heat Melt Curable) polyurethane adhesives, without this list being restrictive.

For example, the following materials can be used:
  crosslinkable hot-melt bonding materials: Evonik®, Vestamelt® X1333-P1, Nolax® HCM 555, Lohmann DuploTEC®, Tesa HAF®, non-crosslinkable hot-melt bonding materials: EMS Griltex® CE20, EMS Griltex®CT100, Nolax Cox® 391.

Step (d)

At the shaping step (d) of a hybrid element, the sheet of composite material can be shaped before its application to the sheet of metallic material and its attachment thereto using the layer of bonding material. However, such a shaping step is advantageously performed at the same time as the joining step so as to facilitate production of the part and reduce manufacturing time.

This step (d) is performed so that the sheet of composite material partially covers a face of said sheet of metallic material.

Shaping can notably be performed by hot stamping, preferably directly on the sheet of metallic material.

The sheet of composite material is joined to the sheet of metallic material by means of the layer of bonding material in predetermined conditions, notably including temperature, pressure, and possibly duration.

Advantageously, these predetermined temperature conditions correspond to the hot stamping conditions of the sheet of composite material, which can vary depending on the composition of the latter.

Advantageously, the shaping step (d) of a hybrid element can be a hot stamping step (also known as thermocompression) of said sheet of composite material on said sheet of metallic material in efficient temperature and pressure conditions to shape said sheet of composite material, the layer of bonding material being positioned between the sheet of composite material and the sheet of metallic material, said bonding material being able to join the sheet of composite material to the sheet of metallic material in the hot stamping conditions. This notably allows the same tooling to be used for steps (d) and (e), step (e) then being performed by injection or compression molding, for example. In the case of a step (e) performed by compression, this step can be simultaneous with step (d).

Hot stamping can be performed in the following manner, for example. The sheet of composite material is heated, prior to the hot stamping operation, to a sufficient temperature to allow it to soften, for example a temperature that is equal to or greater than the melting temperature of the polymer of the sheet of composite material. The softened sheet of composite material is then placed in a stamping mold, on the sheet of metallic material. The stamping operation is then performed once the mold is closed, under effective pressure to shape the sheet of composite material. For example, the pressure applied can be from 80 to 170 bar, preferably from 100 to 150 bar. The mold may optionally be held at a temperature from 70° C. to 160° C., preferably from 80° C. to 140° C., while pressure is applied.

During the step of provisioning the sheet of composite material or at the end of the stamping step, consideration may advantageously be given to a step of recovering scraps from the sheet of composite material and resulting from the cutting of said sheet or recovery step of the scraps from the sheet of composite material and resulting from the cutting of said web or of failed parts (rejects) when the mold is closed and/or during the stamping operation. These scraps can be ground up and advantageously reused in step (e).

Step (e)

As far as step (e) is concerned, involving the production of rigidification elements, this step implements the overmolding of at least a part of the hybrid element formed in step (d) using a thermoplastic or thermosetting polymer material. This step notably reinforces the hybrid part by increasing its inertia.

Step (e) is implemented whereby the polymer material at least partially covers the parts of the parts of the face of the sheet of metallic material not covered by said sheet of composite material.

The thermoplastic or thermosetting polymer material may be the same or different from the polymer material forming part of the sheet of composite material provided in step (b).

This step can be performed in tooling different from that of step (d).

Preferably, step (e) is performed in the same tooling as that used in step (d), notably when step (d) is performed by hot stamping, which reduces manufacturing costs. Step (e) can then be an injection or compression molding step.

Advantageously, the formed rigidification elements are stiffening ribs, optionally extending substantially perpendicularly to the sheet of composite material, i.e. at the surface of the sheet.

Notably, when the sheet of metallic material has a concavity, these rigidification elements are advantageously arranged inside the concavity to reinforce the assembly. In particular, in case of impact, the presence of the rigidification elements limits substantial opening or closing of the concavity under impact. Notably, in the case of a pillar, the rigidification elements limit substantial opening or closing, as well as the curvature in the height of the pillar or transversely, while maintaining the edge spacing of the recessed section.

Advantageously, randomly placed fibers may be added to the polymer material before overmolding to obtain stronger rigidification elements. These fibers can be identical to or different from the fibers present in the sheet of composite material of step (b). They can be carbon, glass, basalt, metal or polymer fibers, notably aramid fibers.

Advantageously, the fibers added are of the same type as one or more of the fibers present in the sheet of composite material.

In particular, the polymer material may comprise the ground-up scraps from the sheet of composite material and from step (d) or step (b), possibly supplemented with a polymer, notably that present in the composite material of the sheet of composite material or other chemically compatible polymer.

This reduces the overall production cost of the hybrid part.

The invention also relates to a hybrid-structure part of a motor vehicle that can be obtained by implementing the method according to the invention, comprising:
  a sheet of metallic material, notably shaped,
  a sheet of composite material, notably shaped, at least partly covering a face of said sheet of metallic material, the sheet of composite material comprising at least one layer of fibers impregnated or embedded in a polymer matrix, said layer of fibers being selected from among a layer of unidirectional fibers and a layer of woven fibers,
  a polymer material, notably molded, at least partially covering the face of said sheet of metallic material at least partially covered with the sheet of composite material, this polymer material optionally forming ribs.

Such a hybrid-structure part is particularly resistant to impacts, notably in the event of an impact substantially perpendicular to the sheets of metal and composite material.

The compositions of the sheet of metallic material, the sheet of composite material and the polymer material may be as described with reference to the method according to the invention.

This hybrid-structure part may form a structural pillar. It can notably be a structural center pillar located between two doors of a vehicle, or a front or rear structural pillar. It can also be a longitudinal exterior siderail or even a roof crossmember, impact beam or any other structural member of a vehicle.

According to the invention, the sheet of composite material partially covers one face of said sheet of metallic material, the polymer material then covering, at least partially, the parts of the face not covered by said sheet of composite material. This limits the creation of scraps of sheet of composite material and covers the surface of the sheet of metallic material left free, without affecting the impact resistance of the part.

Advantageously, the parts of the sheet of metallic material left uncovered, or some of these parts, can be parts intended to secure the hybrid part to another structural part, particularly by welding. These are, for example, edge parts of the hybrid-structure part. The attachment thus achieved between the two pieces can be used to stiffen the hybrid part, for example, by forming a closed cross-section; it can also be used to join the hybrid part to a metal part of the motor vehicle bodywork otherwise already pre-assembled: for example, in the case of a center hybrid pillar, the parts of the sheet of metallic material left uncovered can be welded on the upper part to a roof crossmember or side roof rail and on the lower part to an outer siderail or metal rocker panel.

Advantageously, at least one edge of the sheet of metallic material can have predetermined fastening areas, notably by welding, that are covered neither by the sheet of composite material nor by the polymer material, said predetermined fastening areas being separated by areas covered with polymer material. This arrangement limits the inertia ruptures on the edge(s) of the sheet of metallic material and thus prevents it from tearing or deforming extensively in these areas.

In this case, it may be advantageous to foresee that an edge of the structural part, on which an edge of the sheet of metallic material is attached, has depressions. The areas between the depressions are intended to be in contact with the fastening areas of the sheet of metallic material, the depressions being intended to be in contact with the zones of the sheet of metallic material coated with polymer material. This strengthens the assembled edges.

Of course, several edges of the structural part intended to be secured to the hybrid part may have depressions.

Advantageously, these depressions are shaped to compensate for the extra thicknesses of the edge of the sheet of metallic material associated with the presence of areas covered with polymer material.

The invention also relates to an assembly of the hybrid-structure part according to the invention to a notably metal structural part.

Figure 2:
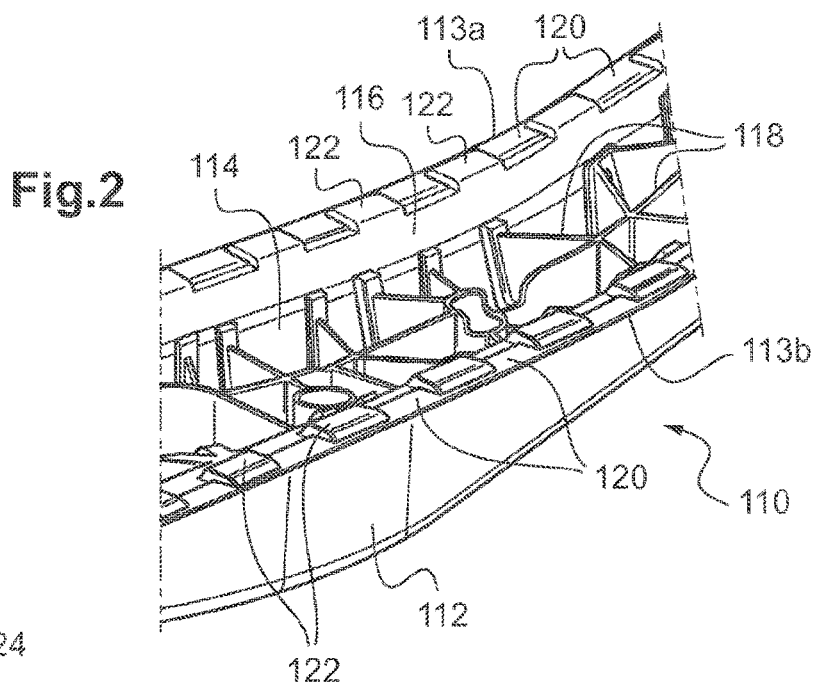
Figure 3A:
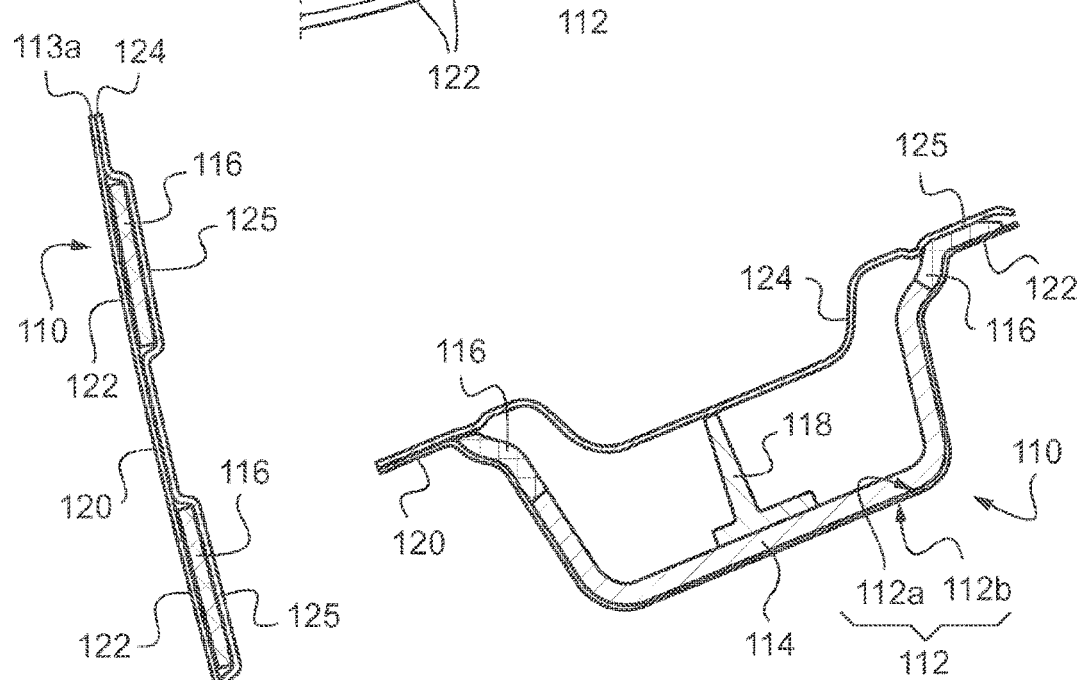
Figure 3B:
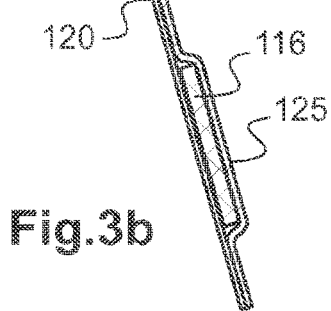

The invention will now be described in reference to the following non-limiting figures:

FIG. 1 is an exploded perspective view of an embodiment of a hybrid-structure part according to the invention, FIG. 2 is a partial perspective view of a hybrid-structure part according to another embodiment, view of the concave side of the part, FIG. 3a is a transversal cross-section of the part shown in FIG. 2, assembled to a structural part; FIG. 3b is a longitudinal cross-section of an edge of the part shown in FIG. 2, assembled to a structural part.

FIG. 1 represents a center structural pillar of a motor vehicle 10 comprising:
a shaped sheet of metallic material 12,
a shaped sheet of composite material 14,
a molded polymer material 16 at least partially covering the sheet of metallic material 12 covered with the sheet of composite material 14, the polymer material 16 optionally forming ribs 18.

The sheet of metallic material 12 is in the form of a hollow part, having a concave inner face 12a and a convex outer face 12b.

The sheet of composite material 14 covers the face 12a of the sheet of metallic material 12. This sheet of composite material 14 comprises several layers of fibers, impregnated or embedded in a polymer matrix.

It should be noted that the invention is not limited to a particular shape of the face 12a of the sheet of metallic material 12 on which the sheet of composite material 14 is applied, this face 12a being either a convex or other face.

The polymer material 16 here forms a network of ribs 18 extending advantageously inside the concavity of the sheets 12 and 14 and partly covering the edges of the two sheets 12, 14.

For example, a hybrid center pillar 10 comprising:
a steel sheet 10 with a thickness of 0.67 mm,
a 4.35 mm thick sheet of polyamide 66-based composite material containing 55 to 80% of unidirectional carbon fibers and woven glass fiber by weight, and
a 2 to 4.5 mm variable thickness of thermoplastic material 16 made of polyamide 66 containing 50% chopped glass fibers by weight,
is 30% lighter in relation to an all-steel pillar, having the same impact behavior (checked through simulation, for example).

FIGS. 2 and 3a, 3b partially represent a hybrid-structure part 110 according to another embodiment. In this embodiment, the hybrid-structure part 110 also comprises a shaped sheet of metallic material 112, a shaped sheet of composite material 114 and a molded polymer material 116 partially covering the sheet of metallic material 112. As can be seen in FIGS. 2 and 3b, the polymer material 116 forms ribs 118.

As in the preceding embodiment, the sheet of metallic material 112 is in the form of a hollow part, having a concave inner face 112a and a convex outer face 112b.

In this embodiment, it should be noted that the sheet of metallic material 112 is not fully covered by the sheet of composite material 114, notably at its longitudinal edges 113a and 113b. These longitudinal edges 113a, 113b, have fastening areas 120 alternating with areas 122 covered in polymer material 116. The fastening areas 120 are covered neither by the sheet of composite material 114 nor by polymer material 116, allowing them to be secured to a structural part, notably to secure them by welding to a metal structural part.

Furthermore, it should be noted that the parts of the sheet of metallic material 112, which are not fastening areas 120 and that are not covered by the sheet of composite material 114, are covered with polymer material 116, as can be seen more particularly in FIG. 3a (left part of the figure). In other words, in this embodiment, in a transversal cross-section, each part of the sheet of metallic material 112 that is not attached to a structural part is covered either by the sheet of composite material 114, or by the polymer material 116. In another embodiment not shown, there may be parts of the sheet of metallic material 112 not attached to a structural part and not covered by any other material.

A metallic structural part 124 is partially shown in the cross-sections 3a and 3b. For better assembly with the hybrid-structure part 110, the edges of this part 124 have hollow areas or depressions 125 located opposite the areas 122 covered with polymer material 116 and designed to compensate the overthicknesses of the edge 113a due to the presence of these areas 122.

The invention claimed is:

1. A hybrid-structure part of a motor vehicle comprising:
a sheet of metallic material,
a sheet of composite material, at least partly covering a face of the sheet of metallic material, the sheet of composite material comprising at least one layer of fibers impregnated or embedded in a polymer matrix, the at least one layer of fibers being selected from among a layer of unidirectional fibers and a layer of woven fibers,
a polymer material, molded, at least partially covering the face of the sheet of metallic material which is at least partially covered with the sheet of composite material, the polymer material optionally forming ribs,
characterized in that the sheet of composite material partially covers the face of the sheet of metallic material and in that the polymer material at least partially covers uncovered parts of the face.

2. The hybrid-structure part according to claim 1, characterized in that at least one edge of the sheet of metallic material comprises predetermined fastening areas that are covered neither by the sheet of composite material nor by the polymer material, the predetermined fastening areas being separated by areas covered with polymer material.

3. The hybrid-structure part according to claim 1, wherein the sheet of composite material comprises at least one layer of unidirectional fibers and at least one layer of woven fibers.

4. The hybrid-structure part according to claim 1, wherein the sheet of composite material comprises one or more layers of identical or different fibers, the fibers being selected from among glass fibers, carbon fibers, basalt fibers, metal fibers or aramid fibers.

5. The hybrid-structure part according to claim 1, wherein the shaped rigidification elements are stiffening ribs, optionally extending substantially perpendicularly to the sheet of composite material.

6. The hybrid-structure part according to claim 1, wherein the polymer material comprises randomly arranged fibers.

* * * * *